United States Patent [19]

von Hagel et al.

[11] 4,388,195
[45] Jun. 14, 1983

[54] PROCESS AND APPARATUS FOR THE CHEMICAL-MECHANICAL TREATMENT AND PURIFICATION OF GROUND WATERS, SURFACE WATERS AND EFFLUENTS

[75] Inventors: Gunter von Hagel, Aarbergen; Norbert Berlenbach, Wiesbaden-Dotzheim; Gerhard Werner, Langenau, all of Fed. Rep. of Germany

[73] Assignee: Passavant-Werke Michelbacher Hutte, Fed. Rep. of Germany

[21] Appl. No.: 54,900

[22] Filed: Jul. 5, 1979

[51] Int. Cl.³ .................................................. C02F 1/56
[52] U.S. Cl. ....................................... 210/709; 210/713; 210/714; 210/725; 210/727; 210/738; 210/802
[58] Field of Search ............. 210/42 R, 46, 49, 51–54, 210/86, 96.1, 97, 112, 138, 143, 195.3, 198 R, 199, 202, 206–208, 702, 709, 713, 714, 723–728, 738, 802

[56] References Cited

U.S. PATENT DOCUMENTS

| | | | |
|---|---|---|---|
| 3,605,775 | 9/1971 | Zaander et al. | 210/42 R |
| 3,617,559 | 11/1971 | Cywin | 210/46 |
| 3,660,284 | 5/1972 | Camp | 210/49 |
| 3,664,951 | 5/1972 | Armstrong | 210/96.1 |
| 3,923,652 | 12/1975 | Condolios et al. | 210/112 |
| 3,966,600 | 6/1976 | Crowley et al. | 210/46 |
| 4,017,388 | 4/1977 | Albertson | 210/713 |
| 4,049,545 | 9/1977 | Horvath | 210/46 |
| 4,111,802 | 9/1978 | Louboutin | 210/713 |
| 4,142,970 | 3/1979 | von Hagel et al. | 210/49 |

Primary Examiner—Peter A. Hruskoci
Attorney, Agent, or Firm—Larson and Taylor

[57] ABSTRACT

A process and apparatus for the chemical-mechanical treatment and purification of ground and surface waters and effluents of various types employs adding materials for coagulation, flocculation, precipitation, sedimentation and altering the pH value. The process comprises separate process stages carried out successively as follows: (1) a first initial process stage wherein certain additives are admixed to the raw water by stirring; (2) a second initial process stage wherein contact sludge is admixed by stirring; (3) a third initial process stage wherein a flocculent aid and possibly also at least some of the other materials added in the first stage are admixed by stirring with high energy input; and alternatively (4) a fourth initial process stage for the formation of course flocs and completion of reaction of the previously added materials and formation of settleable particles and conglomerations of particles together with adsorbed and attached and occluded raw water components with moderate movement. After the initial process stages a further stage occurs wherein flocs and reaction products and raw water components are separated from the clarified water with separate removal of the separated solids and the clarified water. The separation of flocs and reaction products and raw water components from the clarified water in the further zone is accomplished by inclined sedimentation means and at least a part of the sludge is concentrated to a solids concentration of at least 1% weight/volume after drying with at least a part of the concentrated sludge being returned as contact sludge in the second initial process stage.

18 Claims, 2 Drawing Figures

PROCESS AND APPARATUS FOR THE CHEMICAL-MECHANICAL TREATMENT AND PURIFICATION OF GROUND WATERS, SURFACE WATERS AND EFFLUENTS

BACKGROUND OF THE INVENTION

This invention relates to a process for the chemical-mechanical treatment and purification of ground waters, surface waters and effluents of various types employing reagents involving coagulation, flocculation and precipitation and agents conducive to sedimentation and altering of the pH value.

As is well known, various types of flocculation processes have been employed for a long time in the treatment and purification of waters and effluents. Experience indicates that, especially in the case of strongly polluted waters, adequate purification effects can only be obtained if a part of the so-called flocculated sludge is recirculated. In the most common version of such suspension recirculation processes, the so-called sludge contact process, the raw water mixed with flocculants and/or precipitants and/or flocculant aids and/or agents conducive to flocculation and, if applicable, chemicals altering the pH value, comes into contact with the so-called contact sludge brought into circulation many times.

The contact sludge is continuously separated from the so-called clarified water in a sedimentation zone which is generally arranged in the form of a circle around a central flocculation area and, subsequently, admixed to the raw water in a reaction zone.

The sludge contact process can, in principle, be subdivided into the following five process phases:

Phase I: First flocculation phase (first initial process stage)—Admixture of one or several flocculants (for example iron or aluminum compounds or salts) flocculant aids for example synthetic nonionogenic or anionic or cationic products or activated silica) and/or one or several precipitants (for example calcium hydroxide, calcium oxide or calcium salts) and/or one or several agents conducive to sedimentation (for example ground limestone) and/or if necessary, one or several reagents for altering the pH value.

Phase II. Sludge contact phase (second initial process stage)—Admixture of contact sludges by means of stirring and, if applicable, the further admixture of agents of the type indicated under phase I.

Phase III. Second flocculation phase (third initial process stage)—Admixture of so-called flocculant aids (for example synthetic cationic, nonionogenic or anionic products on polyacrylamide basis and/or natural products or transformed natural products on starch or alginate basis and/or inorganic products, such as activated silica, bentonites, and the like) by means of stirring, and if applicable, admixture of agents of the type indicated under Phase I, utilizing an absorbed stirring energy of more than 20 Watts per m³ of the reaction volume available in this zone, and limiting the retention time to 5 minutes at the most.

Phase IV: Phase for the formation of coarse flocs (fourth initial process stage)—Completion of reaction of the previously added reagents and agents and formation of settleable particles and settleable conglomerations of particles (flocs and reaction products and dispersed components of raw water) together with absorbed and attached and occluded raw water components with at most moderate movement.

Phase V: Separation phase (further process stage)—Separation of flocs and reaction products and raw water components from the clarified water (pure water) and separate removal of the separated solids (sludge) and of the clarified water.

In the case of known sludge contact clarification plants the process phases, as a rule, do not generally run in reaction areas or reaction zones which are adequately separated from each other and strictly allocated to the individual process phases, but, several process phases are always combined. The tailoring of optimum conditions for each of the process phases is not possible by such a process procedure. Due to the low solids concentration of the return sludge, a multiple recirculation of the water to be treated is necessary; moreover, the volume of the water quantity to be circulated is commonly three to ten times that of the plant throughput. This brings the result that in spite of the addition of large quantities of reagents the residual content of suspended solids, remaining in the clarified water and mostly finely dispersed, remains relatively large and, in addition, considerable quantities of flocculant aids added are drawn off, unused, with the clarified water.

Due to the long total reaction time and settling time required, the large size of the plants proves to be a particular disadvantage. The resulting idle times make even the manual regulation of the dosing quantity of the agents employed for treatment purposes, difficult to a high degree. Automatic process control, in particular in the case of strongly fluctuating raw water characteristics, is an illusion.

The filters, frequently located after the sludge contact clarifiers for purposes of further treatment of the water, must be filled with very fine filter material with thick filter layers since the retention of, in particular, the finely dispersed particles would otherwise not take place or to only a limited extent.

In addition to the high additional investment costs caused by this, considerable maintenance expenditure is necessary due to the shorter filter life, resulting therefrom. The results which are thus obtainable are generally unsatisfactory and often insufficient, when measured, in particular, against the requirements placed in recent years for potable water and service water quality, which have increased appreciably compared to previous standards.

DETAILED DESCRIPTION

Figure 2:
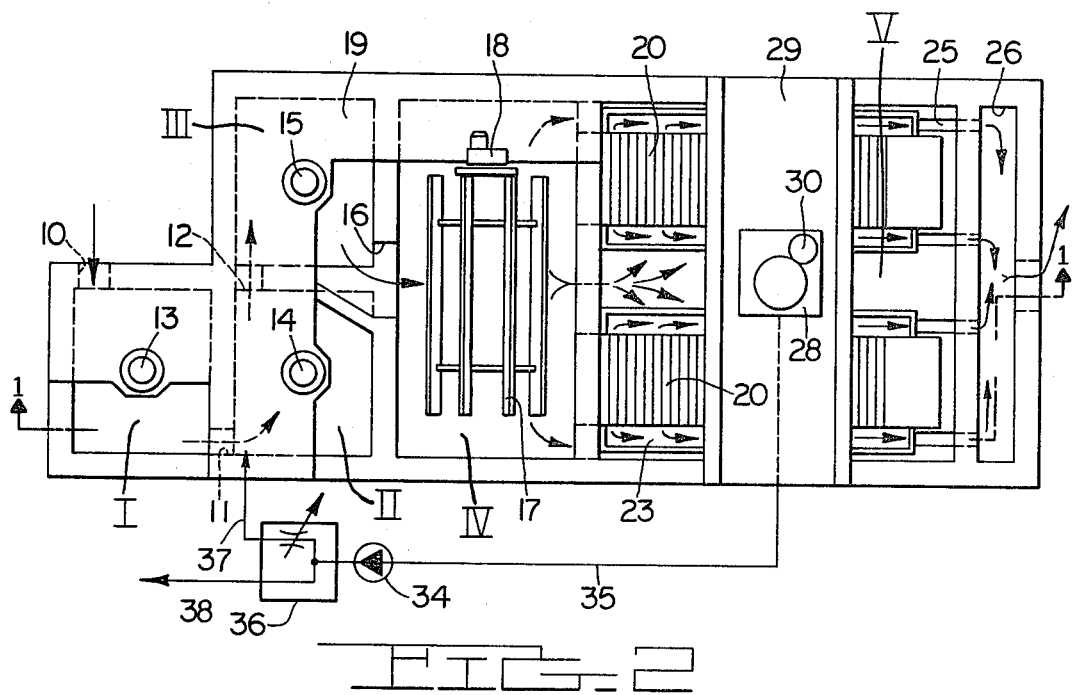

The process according to our invention, described as follows, generally avoids the disadvantages referred to above. It enables the maximum purification efficiency to be obtained, having regard to pollutants and water components of every type which can be removed at all by flocculation or precipitation processes from raw water. At the same time, investment and operating costs can be kept to a minimum. The floor space requirements are extremely low. The process according to the invention relates to flocculation and precipitation processes, as well as the subsequent separation and concentration of the separated solids. It can be employed not only as the sole treatment process for water and effluents, but also as the initial phase of treatment plants with subsequent filter stages.

According to our invention, it is proposed that the main process steps of the contact sludge process, mentioned above, should be carried out in reaction tanks which are separated from each other to a sufficient degree and are allotted to individual process stages, containers, or zones. The flow passes successively through the steps in the sequence (Phases I-V) as indicated above.

Within the process according to our invention separation of the solid particles or conglomerates of solid particles contained primarily in the raw water, or formed in the course of the flocculation or precipitation processes from the raw water takes place in parallel, inclined plate and/or tube settler units, located immediately after the reaction stages. It is essential for the effective operation of the process, contrary to previous known processes, that the sludge which has already been concentrated is returned to the reaction areas of phase II and/or III as contact sludge. The recirculation of contact sludge is carried out in addition to the introduction of different reagents, as described above, within the individual process stages.

As viewed under present-day conditions, we have found that the purification efficiency of prior art sludge contact units is inadequate. From extensive investigations of the prior art as compared to our improved process, it was surprisingly discovered that, only if the individual process stages of the sludge contact process are strictly separated and the stirring energies to be introduced into the various stages of the process are provided in differentiated amounts, can you obtain conglomerates of solids to be separated which are extraordinary large and which have above average rapid sedimentating properties. That is, the stirring energies to be introduced into the different types of flocculating, precipitation and agglomerating processes occurring in the individual phases, such as phases I, II and III, are tailored to optimum requirements. The flocs which form extremely quickly in the subsequent coarse floc regeneration phase IV also have the above mentioned properties.

While such extremely well formed flocs are essential for an optimum separating effect, they are extremely sensitive to very small shear forces. To prevent further break-down or splitting off of small floc fragments which are difficult to settle, it is necessary to avoid long flow paths, as well as any other unfavorable influence on the flocs, which would cause the pure water quality at the discharge of the sedimentation to be deteriorated appreciably. Sludge contact units of known design are built according to principles under which the breakdown effect and reduction in quality, just described, is unavoidable. The long retention times and the inevitable mutual influencing of the flocs in view of the circulation path cannot be prohibited in such units. Also, the separation of phases IV and V is inadequate, as the sedimentation paths are, in principle, too long.

The process according to our invention envisages a parallel plate and/or tube settler system as the sedimentation stage immediately following phase IV. We have found that the optimum shaped agglomerates, formed under the best possible conditions but sensitive to shear forces and originating from the reaction zone of phase IV, will only in this way be separated readily and effectively from the clarified water in a completely uniform laminar flow and in less than one minute. Transportation of such flocs is carried out very gently between phases IV and V of our process over a distance of only a few meters towards the location where actual settling takes place over a sedimentation path amounting only to a few centimeters. The requirements for optimum water quality can only be achieved in this manner. Comparative values of applicants' invention and the prior art are shown in the following Table:

| 1 | 2<br>Conventional Sludge Contact Clarifiers | 3<br>Applicants' Process | 4<br>Improvement by factor of X |
|---|---|---|---|
| length of sedimentation path | 2000–8000 cm | 5–7 cm | |
| surface loading rate ($m^3/m^2 \cdot hr$) on settling tank area | 2–5 | 30–52 | 10–15 |
| proportion of recirculated sludge (% of water throughput) | 100–500 | 1–3 | |
| concentration of recycled sludge (gr/ltr.) | <5 | up to 100 | up to 20 |
| energy input into recirculation sludge contact stage ($Watt/m^3$ of basin volume) | 1–10 | 20–150 | |
| time required for flocculation and sedimentation (minutes) | 60–150 | 10–15 | 6–10 |
| residual concentration of primary flocculant cation in clarified overflow (ppm) | 1–3 | 0.1–0.3 | 10 |
| residual concentration of polyelectrolyte in clarified overflow | 10–20% of feed | <<10% | 2–3 |
| turbidity of clarified overflow | 0.5–2 FTU | <0.3 FTU | |
| running time of filters | | | 2–10 |
| time required to achieve stable operation of plant after changes in operating conditions* (minutes) | 100–300 | 15–20 | 7–15 |
| concentration of sludge removal from system | <1% | 6–25% | 6–25 |

*Hydraulic shock loads, chemical feed, variations in energy intake.

We have discovered that if the process according to our invention is applied consistently, the suspended solids remaining in the settled clarified water can be reduced to a degree previously unknown and almost independently of the type of the raw water. Our process enables suspended solids to be removed down to masses of under 0.2 to 0.5 $g/m^3$, as compared to minimum values of approximately 5 to 10 $g/m^3$, under well known prior processes, under similar raw water conditions. In addition, the hydraulic load (surface loading rate) of the sedimentation units, expressed in $m^3/m^2$ of projected area.hr, can be more than doubled without disadvantage.

Also, the process according to our invention permits the flocculation of colloidal raw water impurities to an extent previously unknown and in virtually quantitative terms, as well as the appreciably greater removal even of adsorbable soluble impurities, as compared to previously known flocculation processes. At the same time, the formation of flocculated agglomerates in phase IV of our process with their optimum degree of sedimentability is not unfavorably influenced, although, depending on the characteristics of the raw water and adaptation to these special conditions, very large stirring energies are employed in our process phases I, II, and III. The desired result, as described above, will also be obtained after the reaction volumes have been reduced many times in comparison to previously known systems.

Furthermore, the reaction time including the separating time in the separator can be reduced to a minimum of approximately 10 minutes but, at the most, to 15 minutes, with the above mentioned quality improvement being obtained. On the other hand, with prior art sludge contact units of the usual design, it is not possible to go below total retention times of 60 minutes and, in the case of larger similar units, retention times are two hours or more.

The processes in a sand filter plant, located after a flocculation precipitation/sedimentation unit are directly influenced by the quality of the clarified water discharged therefrom. The process according to our invention, surprisingly demonstrates considerable advantages in this connection. Where flocculant aids are employed in filtration, our process primarily enables considerable operational savings of these chemicals. Moreover, any residues of polyelectrolytes remaining in the clear water are reduced to a minimum. Optimum conditions for flocculation in phase III, according to our invention, are responsible for this effect. In many large scale filter plants a drastic shortening of the life of filters was observed when flocculant aids were used. Our process completely avoids these disadvantages. The extraordinary purification efficiency of our improved process also makes it possible, in many cases, to eliminate additional filtration of the treated water.

In sludge contact units hitherto employed the quantity of contact sludge circulated is many times the hourly throughput of water. Also, the contact sludge solids concentrations obtainable in these units are extraordinarily low compared to our improved process. Through such prior art units, unnecessarily large water quantities are introduced into the sludge contact phase II. These large water quantities must also flow completely through phases III and IV and also must impose a considerable load on phase V. Surprisingly, it is possible with the process according to our invention to eliminate these disadvantages.

Through our improved process, the proportion of ballast water in the recycled sludge is reduced to 1 to 3% of the plant water throughput (approximately the factor 100) so that all zones II to IV, following zone I, can be dimensioned considerably smaller and/or subjected to greater loads.

It can be assumed that the solids concentrations in contact sludge in conventional sludge contact units are in the region of between 300 and 800 mg/l, equivalent to approximately 0.03–0.08% of dry solids. On the other hand, according to our invention the sludge which is returned into zones II or III is concentrated to a solids content of at least 17%. This occurs initially through the fact that separation of the solids particles and/or their conglomerates takes place within inclined plates or tube settler units. Considerably higher contact sludge concentrations up to 10% dry solids are possible according to our invention, if concentration of the sludge takes place in a thickening zone (zone VI) located below the sedimentation unit, without intermediate conveyance of the sludge. The thickening unit should preferably be located directly below the sedimentation zone V, with the lower outlet ends of the parallel plate sedimentation systems or tube settlers directly discharging the settled flocculated matter into the thickening compartment, and being equipped with a stirring device for the sludge. In this way, flocculant sludges from water treatment with solids concentrations of 6–25% can be obtained, as compared to conventional sludge contact units in which only underflow sludge solids concentrations of less than 0.5–0.8% can generally be reached.

Figure 1:
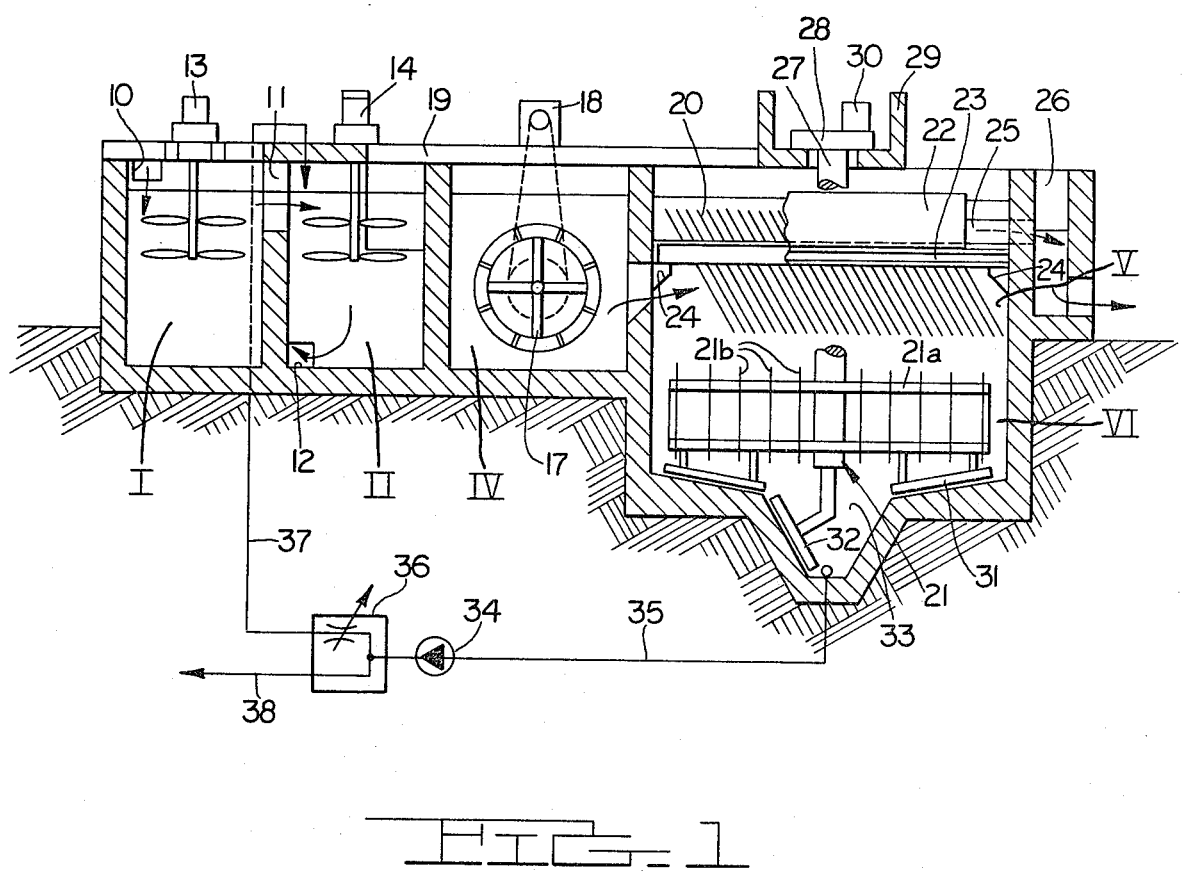

A plant which may be employed to carry out our improved process is shown in the accompanying drawing, forming a part of this application, in which:

FIG. 1 is a longitudinal sectional view through the plant taken along the line 1—1 of FIG. 2; and, FIG. 2 is a top plan view of the plant shown in FIG. 1.

The plant which is partly embedded into the earth contains several chambers, the surrounding and separating walls of which should preferably be constructed of concrete. The first chamber I in which the water to be treated flows through an inlet 10 is connected to the second chamber II by an overflow opening 11. The latter in turn is connected to a third chamber III by a floor opening 12. The first three chambers which have approximately the same capacity are each equipped with vertical shaft stirrer mechanisms 13, 14 and 15, respectively, for complete mixing of the chamber contents.

A widened overflow passage 16 communicates chamber III with a further chamber IV which is approximately double the size of the preceding chambers. Chamber IV is equipped with a horizontal shaft cage stirrer 17 which is driven by an endless chain device operatively connected to a geared motor 18 located above water level. The drive motors of all stirrers are supported by a common bridge 19 which partly covers the chambers.

A sedimenting and thickening compartment lies adjacent and communicates with the fourth chamber IV. The upper section of the compartment defines a chamber V having a square cross section, with two groups of inclined plate separators 20 mounted therein. A lower thickening section having a circular cross section defines a chamber VI beneath the chamber V. Mounted for rotation within the lower chamber VI is a thickening and scraping assembly 21. The groups of inclined plate separators 20 are provided with collecting troughs 22 for receiving treated water. By means of these troughs the plate groups or packages are each supported on two longitudinal members 23, resting on brackets 24. Pure water pipes 25 pass from the troughs 22 into a common receptacle 26 from which the treated water is withdrawn for further use or further treatment.

The thickening and scraping assembly 21 is supported by a central shaft 27 having its upper bearing 28 mounted on a bridge 29. A drive motor 30 is carried by the bearing 28. The scraper assembly 21 consists of horizontal arms 21a with picket rods 21b extending up to locations adjacent the lower side of the plate group or packages, as shown. Scraper blades 31 are suspended on lower arms of the scraping assembly 21 and these blades scrape over the inclined floor of the thickening chamber VI. A cantilevered arm with a scraper 32 also extends from the lower end of the central shaft 27 into a central sludge sump 33.

A conveying pump 34 is connected by a conduit 35 with the discharge of the sludge sump 33. The pressure side of pump 34 communicates with a branch valve 36 which in turn is connected by a branch conduit 37 to chamber II. The volume of the flow through conduit 37 can be regulated by suitable means. Another branch conduit 38 from valve 36 is shown as discharging away from the plant.

Storage tanks and dosing equipment, enabling agents for inducing or supporting precipitation, flocculation and sedimentation to be passed to chambers I and III, are not illustrated since such equipment is of a conventional type well known in the art to which our invention relates. Also, the inclined plate separators 20 and the scraper assembly 21 are conventional as shown in the von Hagel U.S. Pat. No. 4,142,970.

In operation the raw water fed into the first chamber I flows successively through chambers I to III and is mixed with the chemicals added or with the contact sludge by the stirrer mechanisms 13, 14 and 15, respectively. In the chambers I and II moderate stirring energy is employed while in chamber III high stirring energy is employed. In chamber IV, the final stage of reaction, the formation of sedimentable flocs takes place under no more than moderate stirring.

From chamber IV the floc/water mixture reaches the intermediate areas of chamber V adjacent to the plate group or packages and flows laterally therefrom almost horizontally into the inclined plates 20. The pure water from which the solids have been removed, leaves the plates 20 at a higher elevation and at the side, and then passes into the troughs 22 from where it flows into the common receptacle 26. The sedimentable solids removed by the plates 20 slide downwards along the plates and flow without any intermediate conveyance directly into the thickener chamber VI and into the field of influence of the picket rods 21b of the assembly 21. The highly thickened sludge which has sunk to the base of chamber VI is first scraped into the central sump 33 and from there withdrawn by the pump 34. A regulatable part of the sludge passes into the second chamber II by the branch pipe 37 as contact sludge, while the excess sludge is conveyed for further treatment, such as mechanical dewatering or incineration.

A plant of the above described type actually constructed has the following layout data and operates with the following parameters and results: The first three chambers have an effective volume of 113 m$^3$ each. At a raw water flow of 55 m$^3$ per minute this gives a retention time of approximately 2 minutes per chamber. The fourth chamber IV has a capacity of 255 m$^3$, resulting in a retention time of approximately 4.5 minutes. As a flocking agent aluminum sulphate—Al$_2$(SO$_4$)$_3$.18-H$_2$O—is dosed in a quantity of 25 ppm into the chamber I. As flocking aid anion active polyacrylamide is added into the chamber III in a quantity of 0.5 ppm. The sludge withdrawn from the sludge sump has a solids content of 60–80 gr/ltr. while the residual pollution of the pure water lies below 5 mg/ltr. A proportion, representing approximately 2% of the volume throughput of the plant is returned from the sludge as contact sludge into the chamber II, at a given flow quantity that is approximately 1.1 m$^3$/min.

As mentioned above, the process according to our invention enables the volume of returned contact sludge to be restricted to less than 3% volume of the total plant water throughput. Consequently, in addition to the further reduction of the reaction volumes made possible, the additional hydraulic load of the parallel plate or tube separator units can be reduced to a minimum.

A further advantage in our process envisages adding the return sludge to the raw water at least partly into zone III, together with the flocculant aid (polyelectrolyte). The selection is influenced by the degree of difficulty of treating the raw water by flocculation and/or precipitation processes. Many types of raw water or reduced demands placed on the settled water quality permit the reaction zone IV to be omitted completely or various process phases to be carried out in common in one reaction zone. In one such case, contact sludge and flocculant aids are, according to our invention, added in one of the remaining zones II or III.

The total retention time of the water in the flocculation and separation system is extraordinarily low with our improved process whereby any idle times arising therein are very small. This fact is of considerable importance for practical operation and the control of our process. In general, it permits the introduction of new methods of flocculation and sedimentation process control into water treatment technology. It is well known that sludge contact units of the usual design cannot be controlled automatically or if so, only to a very low degree, as their principle of operation is not suitable for this.

A further important advantage of the process is therefore to enable the process operation to be tailored in particular to varying characteristics of water or waste water to be treated, and depending on one or several readings, it is possible to vary, individually or in common, the quantity of return sludge and/or the quantities of reagents added in the different reaction zones and/or the stirring energy in zones I-III. In this way, the stirring energies in the reaction zones alloted to phases I, II and III are increased, as may be required, appreciably above 20 Watts/m$^3$ of the available reaction volume in each case. The quantity of the solids contained in the raw water and/or clarified water and/or soluble matter, as well as the concentration of the contact sludge and/or the contact sludge concentration in the reaction areas can serve as control units. In addition, further suitable parameters, for example, turbidity, color, colloidal content of the clarified water/raw water and the like can also be taken as control units. The height of the sludge level in the thickening zone can also be incorporated in the control system.

While we have shown our invention in but one form, it will be obvious to those skilled in the art that it is not so limited, but is susceptible of various changes and modifications without departing from the spirit thereof.

What we claim is:

1. Process for the chemical-mechanical treatment and purification of ground water, surface waters and effluents, comprising the following steps:
   first passing the water being treated through a series of at least three initial process stages which are carried out in initial zones, including:
   (a) in a first initial process stage, which is carried out in a first initial zone, admixing at least one of the following materials with the water by means of stirring:
      (1) flocculants
      (2) flocculation aids
      (3) precipitants
      (4) agents conducive to sedimentations
      (5) agents for altering the pH value of the raw water in an amount effective in flocculating impurities from the water and forming sedimentable flocs;

(b) in a second initial process stage, which is carried out in a second initial zone, admixing contact sludge by means of stirring with the water; and (c) in a third initial process stage, which is carried out in a third initial zone, admixing at least flocculant aids, using stirring energy input of more than 20 Watts per cubic meter of the reaction volume available in the zone of this initial process stage with a water retention time of no more than about 5 minutes;

then, after said initial process stages, a further process stage including flocculating said impurities and forming said sedimentable flocs, separating the flocs and reaction products and raw water components from the clarified water in a further zone separate from the said initial zones with separate removal of the separated solids, as sludge, and the clarified water from said further zone, with the separation of flocs and reaction products and raw water components from the clarified water in sedimentation equipment, and including concentrating at least a part of the sludge to a solids concentration of at least one percent weight volume and returning at least a part of the concentrated sludge as said contact sludge into said second initial process stage.

2. A process as defined in claim 1, in which the concentration of the part of the sludge being returned is carried out in a thickening zone located below said further zone without intermediate mechanical conveyance.

3. A process according to claim 2, wherein, in said thickening zone, in addition to gravity, mechanical forces are also imparted by means of a picket fence device which acts on the flocs descending within the water phase.

4. A process according to claim 1, wherein said third initial process stage further includes adding in addition to the flocculation aids at least one of the said flocculants, precipitants, agents conducive to sedimentation, and agents for altering the pH value of the raw water.

5. Process for the chemical-mechanical treatment and purification of ground water, surface waters and effluents, comprising the following steps:

first passing the water being treated through a series of at least three initial process stages which are carried out in initial zones, including:

(a) in a first initial process stage, which is carried out in a first initial zone, admixing at least one of the following materials with the water by means of stirring:
(1) flocculants
(2) flocculation aids
(3) precipitants
(4) agents conducive to sedimentations
(5) agents for altering the pH value of the raw water in an amount effective in flocculating impurities from the water and forming sedimentable flocs;

(b) in a second initial process stage, which is carried out in a second initial zone, admixing contact sludge by means of stirring with the water; and (c) in a third initial process stage, which is carried out in a third initial zone, admixing at least flocculant aids, using stirring energy input of more than 20 Watts per cubic meter of the reaction volume available in the zone of this initial process stage with a water retention time of no more than about 5 minutes;

(d) in a fourth initial process stage, which is carried out in a fourth initial zone, completing the reaction of the previously added materials to bring about formation of sedimentable flocs and settleable conglomerations of particles together with absorbed and attached and occluded raw water components with moderate movement;

then, after said initial process stages, a further process stage including separating the flocs and reaction products and raw water components from the clarified water in a further zone separate from the said initial zones with separate removal of the separated solids, as sludge, and the clarified water from said further zone, with the separation of flocs and reaction products and raw water components from the clarified water in said further zone being carried out employing inclined plate sedimentation equipment, and including concentrating at least a part of the sludge to a solids concentration of at least one percent weight volume and returning at least a part of the concentrated sludge as said contact sludge into said second initial process stage.

6. A process as defined in claim 5, in which the concentration of the part of the sludge being returned is carried out in a thickening zone located below said further zone without intermediate mechanical conveyance.

7. A process according to claim 6, wherein, in said thickening zone, in addition to gravity, mechanical forces are also imparted by means of a picket fence device which acts on the flocs descending within the water phase.

8. A process according to claim 5, wherein said third initial process stage further includes adding in addition to the flocculation aids at least one of the said flocculants, precipitants, agents conducive to sedimentation, and agents for altering the pH value of the raw water.

9. A process according to any one of claims 1 or 5, in which at least the solid concentration of the returned contact sludge and the amount of solids present in the raw water and remaining in the clarified water is measured, and including altering the volume of the contact sludge returned per unit time depending on at least one of these measured results.

10. A process according to claim 9, including varying the stirring energy in the zone of the said third initial process stage in response to changes in at least one of said measured results.

11. A process according to claim 9, including varying the stirring energy in the zone of the second initial process stage in response to changes in at least one of said measured results.

12. A process according to claim 9, including varying the stirring energy in the zone of the first initial process stage in response to changes in at least one of said measured results.

13. A process according to claim 9, including varying the addition of at least one of said added materials in the zone or zones of at least one of said initial process stages in response to changes in at least one of said measured results.

14. A process according to claim 9, including increasing the stirring energy input in the zone of at least one of said first and second initial process stages above twenty Watts per cubic meter of the reaction volume available at any time in these zones in response to changes in at least one of said measured results.

15. A process according to any one of claims 1–3, 4–6 and 8, in which the volume of the water carrying the returned concentrated sludge is limited to less than three percent volume of the total water throughput of the process at any time.

16. A process according to any one of claims 2, 3, 6, or 7, in which the height of the sludge level in the thickening zone is measured and the volume of the contact sludge returned per unit of time is varied in response to changes in this measured result.

17. A process according to any one of claims 1–3, 4–7 and 8, and 8 wherein all initial process stages are in separate zones located in separate compartments separating each zone from each other zone.

18. A process according to one of claims 1–3, 4–7 and 8, wherein at least some of said initial process zones are located in a common compartment.

* * * * *